3,089,834
NUCLEAR REACTOR PLANT
Kristian Dahl Madsen, Vasteras, Sweden, assignor to Allmanna Svenska Elektriska Aktiebolaget, Vasteras, Sweden, a corporation of Sweden
Filed Feb. 26, 1957, Ser. No. 642,533
Claims priority, application Sweden Feb. 29, 1956
6 Claims. (Cl. 204—193.2)

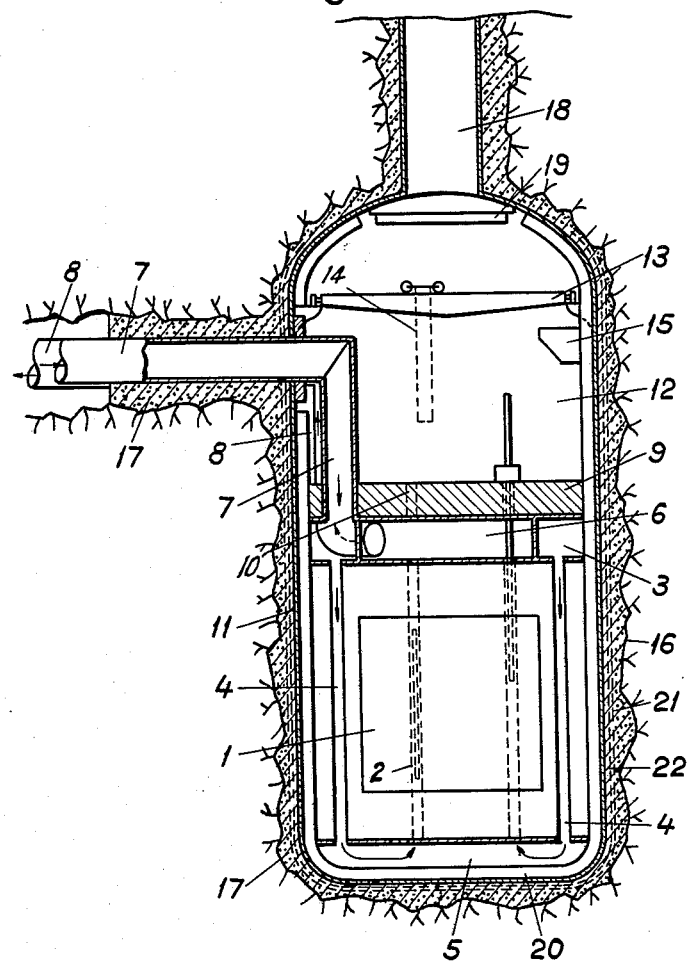

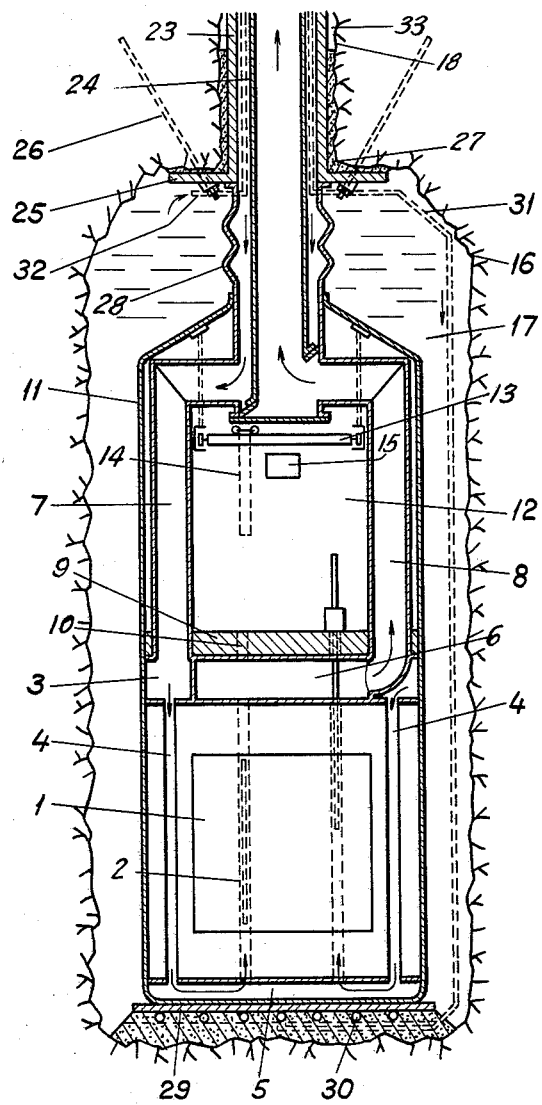

Nuclear reactors with high temperature cooling medium used in the production of steam in power stations have hitherto been constructed by enclosing the reactor in a pressure vessel. The fuel elements have been cooled by compressed gas or pressurised liquid streaming along the same, which medium also circulates through a heat exchanger which produces the steam for the steam turbine.

Insofar as compressed gas is concerned, the pressure has to be maintained high, possibly some tens of atmospheres, if the ventilator power is not to become excessively large. If water is used as the cooling medium, the pressure again has to be high if the temperature of the cooling medium is not to become too low with consequent poor efficiency of the plant.

With reactors for large power, and therefore of large dimensions, the said pressure vessels are also large. As the overall dimensions increase, the thickness of the vessel also increases for the same internal pressure. In fact the thickness of the vessel even for moderate dimensions of the reactor and with moderate pressure may well be prohibitive. Thicknesses of 20 cm. have been mentioned in the relevant literature.

The arrangement according to the present invention overcomes these inconveniences by constructing the reactor vessel with comparatively small wall thickness, and by fitting it into a space formed in rock in such a manner that the rock, preferably provided with a thin smoothing layer of concrete, takes up the stresses. Also water may be used as pressure transmitting medium between the reactor vessel and the rock wall.

In a reactor plant according to the invention it is possible to make the reactor vessel so large that its upper portion forms a space provided with a travelling crane and manipulators for removing consumed fuel elements and inserting new elements.

The removal of the old fuel elements and the insertion of the new ones is performed suitably through a vertically mounting shaft which leads into an obturatable opening in the top of the pressure vessel.

It is important to take measures for avoiding heat tensions in the vessel. This can be effected in different ways. For example, the pressure vessel may be kept at low and comparatively constant temperature by cooling. The cooling means in this case is suitably carried out so that the vessel is provided with an inner thin corrugated wall and the space between both walls is filled with flowing cooling water under the same pressure as the pressure within the vessel. As a modification the pressure vessel may be provided with a resilient joint within the cylindrical portion, or/and with resilient joints between the cylindrical portion, and the top or bottom, respectively. If this arrangement is chosen, the cylindrical surface of the rock or concrete may be provided with a thin cover sheet which facilitates sliding movement between the walls of the rock (concrete) and the vessel.

In another modification the vessel may be positioned freely within the rock space. The surface of the rock, in this case, is sealed by a sheet lining or otherwise, and the interstice is filled with a medium at the same pressure as the pressure within the reactor vessel. Such a medium may be, for instance, water or sodium or a mixture of bismuth and lead, since it is suitable that the medium has fusing point not too far from 100° C. If minor defects occur within the sheet lining in connection with cracks within the rock, the cracks will be sealed automatically in that the liquid metal will freeze. In the case of water it is possible to add for instance fine asbestos fibres for sealing the cracks. The method in question for constructing a large high-pressure vessel is intended primarily for use in connection with heterogeneous reactors. Such a vessel may, however, also be employed as container for homogeneous reactors, or reactors which produce power by means of nuclear processes other than fission of $U_{235}$.

Two reactor plants constructed in accordance with the invention will now be described, by way of example, with reference to the accompanying drawings, in which FIGURES 1 and 2 are sectional elevations of the two plants according to the invention.

Referring to FIGURE 1, the reactor illustrated consists substantially of a reactor body 1 containing fuel rods enclosed within tubes 2, an annular space 3, tubes 4 and a distributing vessel 5 for the incoming reactor cooling medium, a collecting vessel 6 for the outgoing cooling medium and cooling medium inlet and outlet pipes 7 and 8, respectively. The latter is shown in FIGURE 1 as lying behind the former. These pipes may also be arranged concentrically and may be led through a vertical channel 18, see FIGURE 2. A thick plate 9 is provided with holes 10 communicating with the collecting vessel 6 and serves as radiation protection and prevents the gas from circulating between the reactor space and the space above it. These parts are confined within a vessel 11 which serves as the pressure vessel, and which also encloses the upper space 12 containing a hoisting means 13, manipulators 14 for the exchange of the fuel rods, and a television sender 15. The gas within this space may be cooled by means of cooling elements or by cooling the wall of the vessel 11 only. The reactor vessel is located within a space 16 blasted out of rock. The interstice 17 between the rock wall and the vessel is filled with concrete. A vertical channel 18 is closed by a plate 19 and extends into the top of the vessel. In order to avoid heat tension within the pressure vessel it is cooled for example by water having the same pressure as the vessel. The water is kept flowing through a cooling space 20. In cases where the pressure vessel is arranged to stand freely in the rock space 16, the surface of the rocks may be sealed by means of a sheet lining 21, as shown in dotted lines. In the latter case the interstice between the lining 21 and the pressure vessel is filled with a pressure-transmitting material 22.

FIGURE 2 shows an arrangement which is a modification of that shown in FIGURE 1. The inlet pipe 7, extends into the annular space 3 and is connected through a tube 28 to a pipe 23, and the outlet pipe 8 extends from the collecting vessel 6 and is connected to a pipe 24 which is accommodated within the tube 28 and the pipe 23. The lower end of the inlet pipe 23 is provided with a flange 25, which engages the rock where the vertical channel 18 extends into the rock space 16, and is anchored by means of bolts 26 for the periods in which the pressure is zero. Between the surface of the rock and the flange and the outer surface of the lower part of the pipe 23 there is a filling medium, e.g. concrete. The tube 28 is provided with annular corrugations, in order to allow for temperature variations of the pressure vessel 11 or movements of the rock. The pressure 11 rests on a thick metal plate 29, which may be cooled by means of water flowing through channels 30. The space 17 between the rock and outer surfaces of the reactor vessel and of the tube 28 is filled with water. The pressure in this space 17, in the inlet and outlet pipes, in the upper space 12 of the pressure vessel, and in the distributing and collecting vessels may be approximately the same, e.g. 50 to 100 atmospheres. Possibly the water pressure within the space 17 may be held somewhat lower, in order to prevent the water from entering the reactor in the event of a leak occurring in the vessel 11. The water within the space 17 may have to be cooled by a circulation means indicated by an inlet tube 31 and an outlet tube 32 in order to maintain the temperature below a certain maximum, for instance 50° C. Between the inlet pipe 23 and the rock above the concrete filling 27 there is a space 33, which may communicate with the atmosphere.

I claim as my invention:

1. A nuclear reactor located in an underground space formed in rock and comprising a reactor body cooled by a circulating medium under pressure, collecting and distributing means for said circulating medium, fuel handling equipment above said body including hoisting means and manipulators for fuel rods, and a reactor vessel enclosing said reactor body and said means and equipment, the inner wall of the reactor vessel being subjected to a substantial pressure during normal operation of the reactor, said rock having at least one exit to the outside means extending through one such exit to transmit the thermal energy absorbed by the cooling medium to the outside of the rock space, means to bring a fluid cooling medium in heat exchange relation with substantially the whole of the wall of the vessel, said wall being of a thickness insufficient to withstand said substantial pressure, a substantially incompressible pressure transmitting medium capable of transmitting pressures substantially equal to the pressure on the inner wall of the vessel confined in and completely filling the space between the bottom, top and side walls of the vessel and the surrounding rock, and subjected to pressure by the pressure exerted on the interior of the wall of the reactor vessel, and means sealing all exits through the rock from such space and the incompressible medium extending to such sealing means.

2. A reactor as claimed in claim 1 in which said substantially incompressible medium is concrete.

3. A reactor as claimed in claim 1 in which said means to bring a fluid in heat exchange relation with the vessel wall comprises a mantle on the inside of said wall and means to feed a cooling medium to said mantle.

4. A reactor as claimed in claim 1 in which said rock space is sealed and said substantially incompressible medium is water.

5. A reactor as claimed in claim 4 in which said means to bring a fluid in heat exchange relation with the vessel wall comprises means to cool said water.

6. A reactor as claimed in claim 4 in which the rock has a passage extending vertically upward from said space, said means for transmitting thermal energy comprising pipes one within the other connected respectively to the distributing and collecting means extending through said passage, the outer pipe having expansion means therein, and means above said expansion means sealing the outer pipe in the rock.

References Cited in the file of this patent

UNITED STATES PATENTS

| | | |
|---|---|---|
| 2,396,772 | Dailey | Mar. 19, 1946 |
| 2,714,577 | Fermi et al. | Aug. 2, 1955 |
| 2,743,225 | Ohlinger et al. | Apr. 24, 1956 |
| 2,782,158 | Wheeler | Feb. 19, 1957 |
| 2,874,106 | Hammond et al. | Feb. 17, 1959 |

OTHER REFERENCES

Simpson et al., "International Conference on the Peaceful Uses of Atomic Energy," vol. 3, p. 225, August 1955.

NAA-SR-1525, pp. 14 and 20, Mar. 15, 1956.

AECU-3170, 1955, p. 19, Technical Information Extension, Oak Ridge, Tenn.

Dahl, "International Conference on the Peaceful Uses of Atomic Energy," vol. 3, p. 249, August 1955, U.N. Publication, N.Y.

Parkins, Int. Conf. on Peaceful Uses of Atomic Energy, vol. 3, p. 299 (1955).